United States Patent Office 2,814,627
Patented Nov. 26, 1957

2,814,627
N-PHTHALIDYL CARBANILATES

Donald D. Wheeler and David C. Young, Midland, Mich., assignors to The Dow Chemical Company, Midland, Mich., a corporation of Delaware No Drawing. Application August 3, 1956,
Serial No. 602,060

6 Claims. (Cl. 260—343.3)

This invention is concerned with phthalidyl carbanilates having the structure

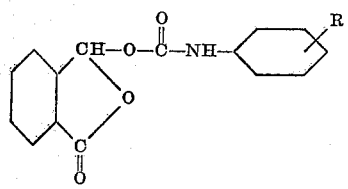

In this and succeeding formulae, R represents hydrogen, chloro, nitro, methyl or ethyl. These compounds are soluble in many organic solvents such as acetone, ethanol and benzene and substantially insoluble in water. The new compounds are useful as parasiticides adapted to be employed as toxic constituents in germicidal preparations.

The above compounds may be prepared by causing phthalaldehydic acid to react with a suitable aryl isocyanate having the structure

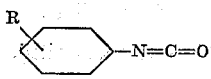

to produce the desired phthalidyl carbanilate. The term "phthalidyl" refers to the radical

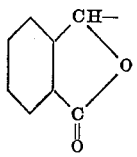

obtained by removing the hydroxyl group from the structure of phthalaldehydic acid.

The terms "phthalaldehydic acid" and "3-hydroxyphthalide" refer to a compound having the structure

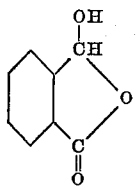

Phthalaldehydic acid is often represented in the literature as having the structure

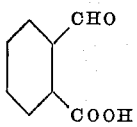

However, the acid employed in this invention and prepared as hereinafter described exists almost entirely in the 3-hydroxyphthalide ring structure, as indicated by a study of its infrared absorption spectrum. Infrared data also indicate the phthalide products to have the ring structure.

In the synthesis, good results are obtained when substantially equimolar proportions of the reactants are employed. The reaction takes place smoothly in the temperature range of from 25° to 150° C. Solvents such as acetone, methyl ethyl ketone and benzene may be employed as reaction medium.

In carrying out the reaction, the appropriate aryl isocyanate and phthalaldehydic acid are mixed together with a solvent and heated to the reaction temperature. The heating is carried out over a period of from one-half hour to 8 hours. During the heating, a reaction takes place with the formation of the desired phthalidyl carbanilate product. A 1,3-diarylurea by-product may also be formed. After completion of the reaction, a major portion of the solvent is removed by evaporation whereupon the urea by-product, if formed, precipitates. The latter is removed by filtration and the filtrate further heated to remove any remaining solvent. The residue is poured into and mixed with water and the carbanilate product thereafter recovered by extraction with benzene. The benzene extract is distilled to remove the solvent and to recover the desired phthalidyl carbanilate product as residue.

The following examples illustrate the invention but are not to be construed as limiting.

Example 1.—Phthalidyl carbanilate

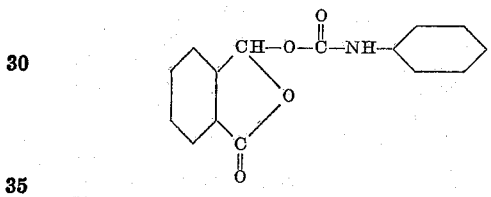

59.6 grams (0.5 mole) of phenylisocyanate and 75 grams (0.5 mole) of phthalaldehydic acid are dissolved in 100 milliliters of methyl ethyl ketone. The resulting mixture is heated under reflux for 3 hours. At the end of this period, part of the methyl ethyl ketone is evaporated off and the mixture cooled whereupon a solid precipitates. The latter, a 1,3-diphenylurea by-product, is removed by filtration. The filtrate is then heated to distill any remaining solvent and the residue poured into 700 milliliters of warm water whereupon an insoluble oil settles out of the mixture. This oil is recovered by extraction with benzene and the benzene extract heated to distill the benzene and to obtain a phthalidyl carbanilate product as a viscous oil having a refractive index, $n_D$, of 1.590. The yield of the product is 93 grams or 75 percent of theoretical.

Example 2.—Phthalidyl 4-nitrocarbanilate

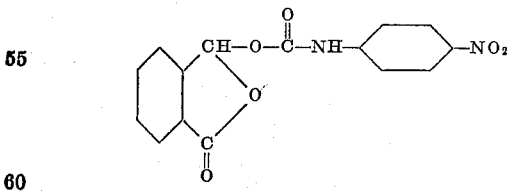

82 grams (0.5 mole) of 4-nitrophenylisocyanate and 75 grams (0.5 mole) of phthalaldehydic acid are mixed in 100 milliliters of methyl ethyl ketone and heated for 4 hours under reflux. The reaction mixture is further heated to evaporate a portion of the solvent and then allowed to cool to precipitate any substituted urea by-product. The latter is removed by filtration and the filtrate heated to remove residual solvent. The residue is washed with water and then extracted with benzene. The benzene extract is heated to distill out the benzene and to obtain a phthalidyl 4-nitrocarbanilate product having a molecular weight of 314.

Example 3.—Phthalidyl 4-chlorocarbanilate 79.2 grams (0.5 mole) of 4-chlorophenylisocyanate and 75 grams (0.5 mole) of phthalaldehydic acid are dissolved in 100 milliliters of benzene. The resulting solution is heated for 4.5 hours under reflux. Thereafter a portion of the solvent is allowed to evaporate and the mixture then cooled. A substituted urea by-product which precipitates is removed by filtration. The filtrate is then heated to remove the remaining solvent and the residue poured into 700 milliliters of warm water to precipitate a phthalidyl 4-chlorocarbanilate product. The latter is extracted with benzene and the benzene distilled to obtain a purified product having a molecular weight of 308.5.

Example 4.—Phthalidyl 4-ethylcarbanilate 73.5 grams (0.5 mole) of 4-ethylphenylisocyanate and 75 grams (0.5 mole) of phthalaldehydic acid are dissolved in 100 milliliters of methyl ethyl ketone and the resulting mixture heated under reflux for 3 hours. At the end of the heating period, the solvent is partially removed by evaporation and the mixture then cooled to precipitate a substituted urea by-product. The latter is removed from the mixture by filtration. The filtrate is then heated to remove the remaining solvent and the residue poured into 800 milliliters of warm water whereupon an insoluble oil precipitates. The latter is extracted with benzene and the extract heated to distill the benzene and to recover a phthalidyl 4-ethylcarbanilate product having a molecular weight of 297.

Example 5.—Phthalidyl 2-methylcarbanilate 66.5 grams (0.5 mole) of 2-methylphenylisocyanate and 75.0 grams (0.5 mole) of phthalaldehydic acid are dissolved in 100 milliliters of benzene and the resulting mixture heated under reflux for 3 hours. At the end of the heating period, the solvent is partially removed by evaporation and the mixture then cooled to precipitate a substituted urea by-product. The latter is removed from the mixture by filtration. The filtrate is then heated to remove the remaining solvent and the residue poured into 700 milliliters of water whereupon an insoluble oil precipitates. The latter is extracted with benzene and the benzene extract heated to distill the solvent and to recover a phthalidyl 2-methylcarbanilate product having a molecular weight of 283.

The products of this invention are useful as parasiticides, adapted to be employed for the control of bacteria, fungi, insects and mites. In a representative operation, phthalidyl carbanilate is employed for the control of bean aphids, *Aphis fabae*. In such operations, essentially complete controls are obtained when infested plants are dipped or sprayed with an aqueous dispersion containing as toxic ingredient 0.24 gram of phthalidyl carbanilate per 100 milliliters of solvent.

The phthalaldehydic acid employed in this invention may be prepared by first photochlorinating o-xylene to obtain $\alpha,\alpha,\alpha,\alpha',\alpha'$-pentachloro-o-xylene by passing chlorine gas into o-xylene while illuminating with sun lamps. The resulting chlorinated o-xylene may be heated with an aqueous constant boiling hydrochloric acid and ferric chloride solution to obtain phthalaldehydic acid as more fully disclosed in U. S. Patent 2,748,162.

We claim:

1. A phthalidyl carbanilate having the structure

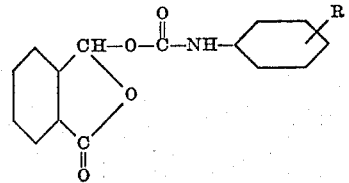

wherein R is a member of the group consisting of hydrogen, chloro, nitro, methyl and ethyl.
2. Phthalidyl carbanilate.
3. Phthalidyl 4-nitrocarbanilate.
4. Phthalidyl 4-chlorocarbanilate.
5. Phthalidyl 4-ethylcarbanilate.
6. Phthalidyl 2-methylcarbanilate.

No references cited.